Figure 1:
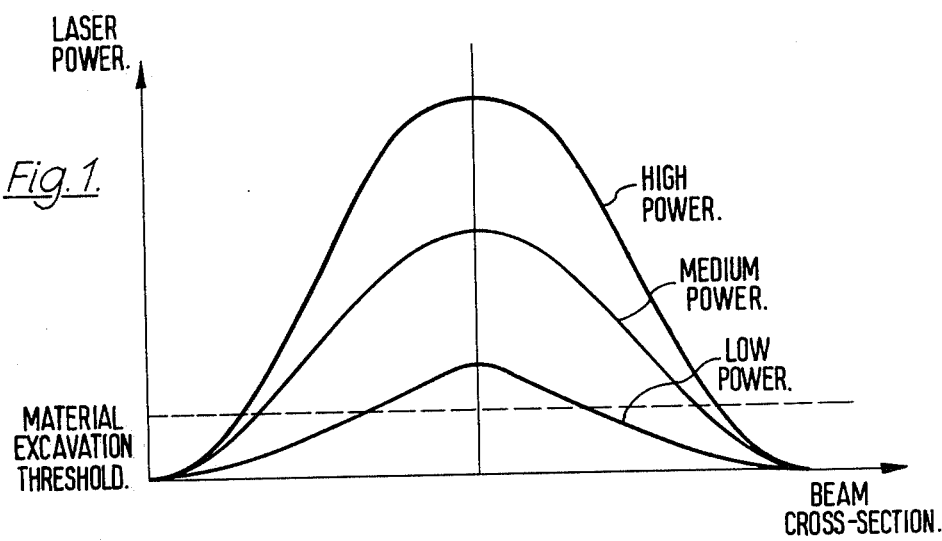

United States Patent [19]

Dalton

[11] 4,015,221

[45] Mar. 29, 1977

[54] PREPARATION OF GRAVURE PRINTING SURFACES

[75] Inventor: Brian L. Dalton, London, England

[73] Assignee: Crosfield Electronics Limited, London, England

[22] Filed: Jan. 21, 1976

[21] Appl. No.: 650,844

[30] Foreign Application Priority Data

Jan. 22, 1975 United Kingdom ............ 2839/75
Mar. 26, 1975 United Kingdom ............ 12763/75

[52] U.S. Cl. .......................... 332/7.51; 346/108; 219/121 L; 350/159; 358/297
[51] Int. Cl.² ................... H01S 3/10; H04N 1/08
[58] Field of Search .......... 346/108, 176; 332/7.51; 331/94.5 A; 219/121 L, 121 LM; 350/150, 159; 356/117 B; 178/6.6 B, 6.6 DD

[56] References Cited

UNITED STATES PATENTS

| 3,368,209 | 2/1969 | McGlauchlin et al. | 346/76 L |
| 3,558,208 | 1/1971 | Hudson | 346/108 |
| 3,636,251 | 1/1972 | Daly et al. | 178/6.6 B |
| 3,787,888 | 1/1974 | Haskal | 346/108 |

*Primary Examiner*—Nelson Moskowitz
*Attorney, Agent, or Firm*—Toren, McGeady and Stanger

[57] ABSTRACT

In apparatus for excavating material from a gravure cylinder surface, for example, by means of a laser beam, the polarization of the laser beam is modulated and the modulated beam is then passed through a polarization analyzer system to a focusing lens which focuses light on to the surface to be excavated. The polarization analyzing system includes an aperture through which a central portion of the laser beam passes, regardless of its polarization the extent to which the remainder of the beam is transmitted by the analyzer depending upon its polarization modulation. The effect of the aperture is to reduce variation in excavation width with the intensity of the beam.

7 Claims, 4 Drawing Figures

PREPARATION OF GRAVURE PRINTING SURFACES

In gravure printing, ink is applied to a printing surface which is formed with cells in the form of depressions to retain the ink. Surplus ink is removed from the walls between the cells and the printing member is then brought into contact with a sheet to be printed, the ink then transferring from the cells to the sheet.

We have previously proposed a method of engraving a gravure printing surface, in which the surface of a cylinder, which may be of metal, has formed therein cells which are of the maximum printing depth required and which are filled with a material more easily decomposed or evaporated by a scanning laser beam than the material of the cylinder body. To engrave the cylinder, it is scanned with a laser beam, the energy of which is modulated in accordance with the image which it is desired to engrave, the intensity and scanning speed of the beam being so chosen that the walls of the cells (which are of the material of the body of the cylinder) are unaffected but the filling material in the cells is decomposed or evaporated to a depth depending on the beam energy of the scanning spot which falls upon it. The laser beam does not then have to be modulated in accordance with the cell pattern but only with the image to be recorded.

The present invention is applicable to such a method but is also applicable to a method in which the laser beam excavates a groove in a suitable printing surface.

A problem which occurs in the laser engraving of gravure cylinders is the appearance of moire patterning on the cylinder caused by variation in the width of the image spot. The problem also manifests itself as a colour shift in highlight areas, where small differing coloured engraved lines can fall upon each other or miss each other as the paper threads through the press.

The change of width arises from the Gaussian intensity distribution across the laser beam and the threshold power required at the surface to excavate material from the surface. Thus, in FIG. 1 of the accompanying drawings the intensity distribution over the beam cross-section is shown for a high power beam, a beam of medium power and a beam of low power. The excavation threshold for a plastics material is indicated by a dotted line. It will be seen that a moderate reduction in amplitude produces only a small change in the effective beam width, that is to say in the width of the beam for which the intensity is above the excavation threshold, but that the effective width of the beam is reduced more rapidly as the beam power is further attenuated. Assuming that successive scanning lines are arranged to overlap at the half-power points, as shown in FIG. 2, as the amplitude is decreased larger gaps will appear between the lines and this will manifest itself in the final print as a density variation. The density variation may "beat" with the cell pattern and thereby produce a moire pattern. In addition, in multicolour work the area variations when a colour is printed will leave white paper showing through, which might or might not be covered by succeeding colours, producing changes in colour between different prints dependent only upon very small changes in paper position on the press.

Figure 3:
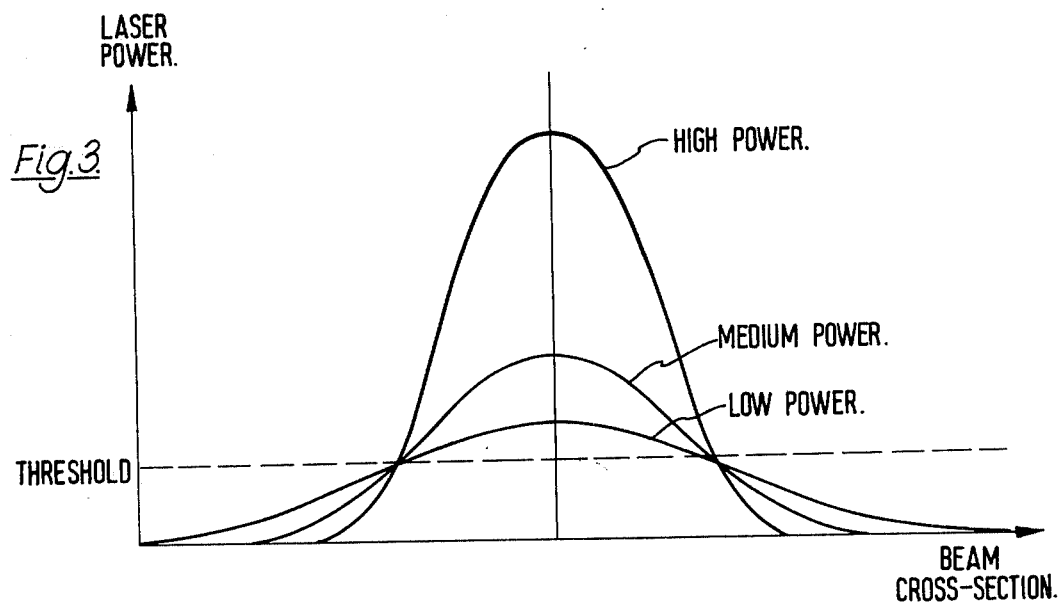

As illustrated by FIG. 3, the variation of the width of the excavated cell or groove could be overcome by varying the laser beam width, where the beam is incident on the workpiece surface, so that beams of lower power have a greater width than beams of higher power, all beams having the same width at the intensity threshold level. However, to achieve this by varying the width of the generated laser beam with the required beam intensity would be difficult and the present invention seeks to achieve substantially the desired result in an alternative way.

Thus, the present invention is concerned with a method of removing material from a surface to be engraved by exposing the surface to a modulated laser beam, the material being removed from the surface, at those points at which the beam intensity is above the excavation threshold, to a depth dependent on the beam intensity. According to the present invention, a modulating signal controls the direction of polarisation of a laser beam and the polarised beam is applied through a polarisation analyser to a focusing lens; the analyser has a central aperture through which a central portion of the beam passes regardless of its polarisation, the presence of the central aperture reducing variations in the widths of holes or grooves excavated in the said surface by laser beams having different degrees of modulation, and the beam power and the aperture diameter being such, in relation to the material of the said surface, that when only the central aperture passes radiation to the focusing lens the power level at the said surface is below the excavation threshold over the whole of the focused spot.

Figure 2:
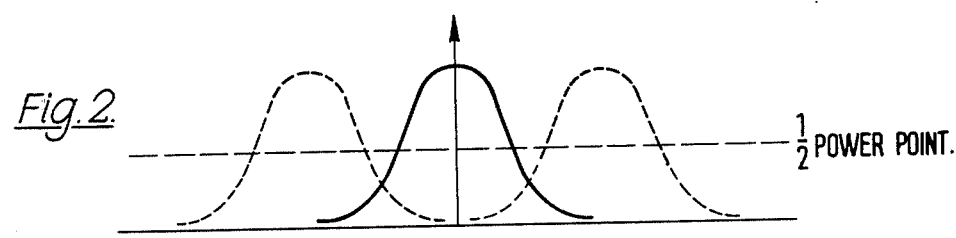
Figure 4:
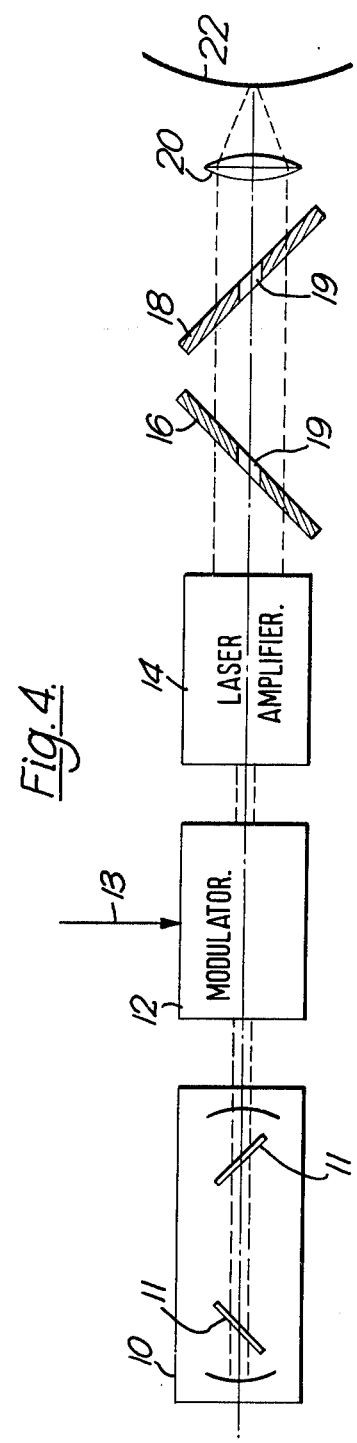

In order that the invention may be better understood, a method and apparatus for carrying the invention into effect will now be described with reference to the accompanying drawings. In the drawings:

FIG. 1, to which reference has already been made, shows a graph of laser power against beam cross-section and also shows the excavation threshold of the material;

FIG. 2, to which reference has also been made, illustrates the overlap between successive scanning lines of the beam;

FIG. 3 to which reference has also been made, illustrates the desired result; and FIG. 4 illustrates apparatus embodying the present invention for substantially achieving the desired result.

Turning now to FIG. 4, a carbon dioxide laser 10 terminated with Brewster windows 11 provides an output of coherent infra-red radiation polarised normal to the plane of the windows. An electro-optic modulator 12, which is preferably of the gallium arsenide kind but which might alternatively be of the cadmium telluride type, receives the plane polarised light from the laser oscillator. This modulator crystal is of known kind and is such that when no modulating voltage is applied to the modulator over line 13, the beam emerging from the modulator is still plane polarised; and when a modulating voltage is applied, the orthogonal vector of polarisation of the coherent light is progressively increased with respect to the vector in the original plane of polarisation of the beam, so that the beam polarisation is successively altered to eliptical polarisation, then to circular polarisation, thereafter to eliptical polarisation with the major and minor axes reversed as compared with the first eliptical polarisation and finally to plane polarised again with the polarisation plane orthogonal to the initial direction of plane polarisation. The beam from the modulator is then passed through a laser amplifier 14, the purpose of which is to increase the power in the laser beam; the reason for providing separate laser elements 10 and 14 is to permit the electro-optic modulator to operate on a beam of relatively low power. The laser amplifier is also designed to provide an emergent beam of about 3 cm. diameter in the example described.

The beam is now passed to a polarisation analysing device consisting of a pair of Brewster angle polarisers 16 and 18 which are of germanium and of the transmission kind. In the case of the analysers 16 and 18, however, apertures 19 are formed in the polarisers. It will be seen that an inner part of the laser beam always passes through the apertures unimpeded to the lens 20. The transmission of the outer part of the laser beam through the analysing device depends upon the degree to which the modulating voltage applied to the electro-optic modulator has modified the polarisation of the beam. The beam is focused by the lens 20 to a spot on the surface of the cylinder 22.

It can be shown that the radius of a focused spot of radiation from a laser beam is inversely proportional to the effective diameter of the lens through which the beam passes. As a consequence, the radius of the focused spot resulting from a modulation such that only the central aperture passes the beam, is greater than the radius of the focused spot resulting from a modulation such that the whole of the beam is passed substantially without attenuation.

In the absence of the central apertures in the Brewster angle analysers, for zero modulation the analysers would if perfect reject all radiation, so that no radiation would reach the lens. For full modulation the analysers would act as clear windows, permitting all radiation to pass through to the lens. For intermediate values of modulation, the "window" provided by the analyser would be less clear and consequently the curves for laser power over the beam cross-section following the analyser would resemble FIG. 1 and the width of that portion of the beam for which the laser power was above the excavation threshold would therefore vary very greatly with the degree of modulation of the beam.

By forming the Brewster angle analysers with central apertures, the centre part of the beam is always passed by the analysers, irrespective of the degree of polarisation modulation. This does not affect the zero modulation condition at the cylinder surface because the narrow beam which reaches the lens is focused to a larger spot than is the wide beam corresponding to full modulation, and the resulting power level within this larger spot is below the excavation threshold. For intermediate values, the radiation passed by the central aperture provides, in effect, a "power pedestal" for the curves in the diagram of FIG. 1 which effectively raises the curves relative to the horizontal excavation threshold line, so that on each side of the vertical centre line of the curves, the points at which the low and medium power curves cross the excavation threshold move towards the point at which the high power curve crosses this threshold. The manner in which the radiation intensity varies over the cross-section of the focused beam is somewhat complex, due to the presence of side lobes in a fully developed Gaussian curve and to diffraction effects, and also due to the fact that in general the radiation passing through the central aperture includes a polarisation vector which is absent from the radiation passing through the analyser annulus surrounding the aperture. The power variation is therefore somewhat difficult to illustrate but the effect is to reduce the differences, at the workpiece surface, in the widths of those portions of the cross-sections of beams of different modulation for which the power is above the excavation threshold.

Although the use of Brewster angle polarisers has been described as the preferred way of carrying the invention into effect, it is also possible to use other forms of polariser; for example grid polarisers can be used.

Furthermore, although the above description has mentioned the provision of ink-retaining cells in the gravure printing member, the invention is equally applicable to a gravure printing member in which the ink-retaining recesses are grooves. The invention enables the depth of the groove to be varied as a function of the modulation of the beam power amplitude whilst the width of the groove remains substantially constant. As before, typically the gravure printing member is a cylinder having a metal base and a plastics coating, the laser beam excavating material from the plastics coating.

I claim:
1. Apparatus for removing material from a surface to be engraved, comprising:
    a laser and polarising means for generating a polarised coherent light beam to excavate material from the said surface to a depth depending on the beam intensity at the surface;
    a polarisation modulator for modulating the polarisation of the beam of coherent radiation;
    and an analysing polariser system through which the modulated beam is directed to a focusing lens for focusing the laser beam on to the said surface, the analysing polariser system being formed with a central aperture through which a central portion of the beam passes to the focusing lens regardless of its polarisation, whereby the width, at the surface to be engraved, of that portion of the beam for which the intensity is above the excavation threshold, is maintained substantially constant irrespective of the beam modulation.

2. Apparatus in accordance with claim 1, in which the analysing polariser system comprises a Brewster angle polariser.

3. Apparatus in accordance with claim 2, in which the analysing polariser system comprises two or more Brewster angle polarisers spaced along the optical path.

4. Apparatus in accordance with claim 1, in which the modulator is of the gallium arsenide crystal type.

5. Apparatus in accordance with claim 4, in which the modulator is located between the laser constituting the source of radiation and a laser amplifier.

6. Apparatus in accordance with claim 1, in which the laser constituting the beam source is formed with Brewster angle windows.

7. A method of removing material from a surface to be engraved by exposing the surface to a modulated laser beam, the material being removed from the surface, at those points at which the beam intensity is above the excavation threshold, to a depth dependent on the beam intensity, comprising the steps of:
    modulating the direction of polarisation of a laser beam in accordance with an incoming signal;
    applying the polarised beam through a polarisation analyser to a focusing lens positioned to focus the beam on the said surface, the analyser having a central aperture through which a central portion of the beam passes regardless of its polarisation;
    the presence of the central aperture reducing variations in the widths of holes or grooves excavated in the said surface by laser beams having different degrees of modulation, and the beam power and the aperture diameter being such, in relation to the material of the said surface, that when only the central aperture passes radiation to the focusing lens the power level at the said surface is below the excavation threshold over the whole of the focused spot.

* * * * *